(12) United States Patent
Zelenov et al.

(10) Patent No.: US 10,733,005 B1
(45) Date of Patent: Aug. 4, 2020

(54) PROVIDING ACCESS TO MOBILE APPLICATIONS BY HETEROGENEOUS DEVICES

(71) Applicant: Parallels International GmbH, Schaffhausen (CH)

(72) Inventors: Anton Zelenov, Moscow (RU); Nikolay Dobrovolskiy, Moscow (RU); Serguei M. Beloussov, Singapore (SG)

(73) Assignee: Parallels International GmbH, Schaffhausen (CH)

( * ) Notice: Subject to any disclaimer, the term of this patent is extended or adjusted under 35 U.S.C. 154(b) by 161 days.

(21) Appl. No.: 15/728,873

(22) Filed: Oct. 10, 2017

(51) Int. Cl.
 G06F 9/455 (2018.01)
 G06F 9/451 (2018.01)
 H04L 29/08 (2006.01)

(52) U.S. Cl.
 CPC .......... G06F 9/45558 (2013.01); G06F 9/452 (2018.02); *G06F 2009/45575* (2013.01); *H04L 67/10* (2013.01)

(58) Field of Classification Search
 CPC ............... G06F 9/45558; G06F 9/452; G06F 2009/45575; H04L 67/10
 USPC ............................................................ 718/1
 See application file for complete search history.

(56) References Cited

U.S. PATENT DOCUMENTS

| 8,271,976 | B2* | 9/2012 | Vega | G06F 9/5077 |
| | | | | 718/1 |
| 8,438,256 | B2* | 5/2013 | Rogel | G06F 9/45533 |
| | | | | 709/223 |
| 8,613,070 | B1* | 12/2013 | Borzycki | G06F 21/6218 |
| | | | | 726/8 |
| 9,507,615 | B2* | 11/2016 | McKenzie | G06F 21/83 |
| 9,910,765 | B2* | 3/2018 | Wade | G06F 11/3688 |
| 2007/0245345 | A1* | 10/2007 | Yamada | G06F 9/453 |
| | | | | 717/174 |
| 2007/0245354 | A1* | 10/2007 | Tomita | G06F 3/1207 |
| | | | | 719/318 |
| 2009/0288084 | A1* | 11/2009 | Astete | G06F 9/45533 |
| | | | | 718/1 |

(Continued)

FOREIGN PATENT DOCUMENTS

| CN | 102165431 B | * 12/2012 | ......... G06F 9/45558 |
| CN | 102193824 B | * 4/2016 | ......... G06F 9/45558 |

OTHER PUBLICATIONS

Winter et al., "A Flexible Software Development and Emulation Framework for ARM TrustZone", 2012, Springer-Verlag, pp. 1-15 (Year: 2012).*

(Continued)

*Primary Examiner* — Wei Y Zhen
*Assistant Examiner* — Junchun Wu
(74) *Attorney, Agent, or Firm* — Lowenstein Sandler LLP (57) ABSTRACT

Systems and methods for providing access to mobile applications by heterogeneous devices. An example method comprises: initializing, by a host computer system, a virtual machine running a mobile operating system (OS); intercepting, by a host agent running on the host computer system, a video output associated with a window of an application running on the virtual machine; forwarding the video output to a client device; receiving, from the client device, a user interface input directed to the application; and forwarding the user interface input to the virtual machine.

18 Claims, 6 Drawing Sheets

(56) References Cited

U.S. PATENT DOCUMENTS

| | | | | |
|---|---|---|---|---|
| 2011/0179417 | A1* | 7/2011 | Inakoshi | G06F 9/45558 |
| | | | | 718/1 |
| 2013/0185720 | A1* | 7/2013 | Tuch | G06F 12/023 |
| | | | | 718/1 |
| 2015/0334162 | A1* | 11/2015 | Krishnamurthy | G06F 3/017 |
| | | | | 715/740 |
| 2015/0379265 | A1* | 12/2015 | Lutas | G06F 21/55 |
| | | | | 726/23 |
| 2016/0044139 | A1* | 2/2016 | Lin | G06F 9/45558 |
| | | | | 709/203 |
| 2017/0024100 | A1* | 1/2017 | Pieper | H04L 67/42 |
| 2018/0173551 | A1* | 6/2018 | Dunn | G06F 9/45558 |
| 2018/0246749 | A1* | 8/2018 | van Riel | G06F 9/4555 |

OTHER PUBLICATIONS

Onoue et al., "A Virtual Machine Migration System Based on a CPU Emulator", 2006, IEEE (Year: 2006).*

Dong et al., "A Virtualization Solution for BYOD With Dynamic Platform Context Switching", 2015, IEEE (Year: 2015).*

Lee et al., "General Purpose Hardware Abstraction Layer for Multiple Virtual Machines in Mobile Devices", Feb. 2009, ICACT (Year: 2009).*

Suzuki et al., "Implementation of Virtual Machine Monitor for ARM Architecture", 2010, IEEE (Year: 2010).*

Ryu et al., "An All-round Virtual Machine Monitor for Mobile Environments", 2010, IEEE (Year: 2010).*

Hwang et al., "System Virtualization using Xen Hypervisor for ARM-based Secure Mobile Phones", 2008, IEEE (Year: 2008).*

Parallels, Parallels Remote Application Server Solutions Guide, 1999-2017, 43 pages.

Parallels, Parallels Remote Application Server Administrators Guide, 1999-2016, 234 pages.

* cited by examiner

PROVIDING ACCESS TO MOBILE APPLICATIONS BY HETEROGENEOUS DEVICES

TECHNICAL FIELD

The present disclosure is generally related to virtualized computer systems, and is specifically related to systems and methods for providing access to mobile applications by heterogeneous devices.

BACKGROUND

Virtualization may be viewed as abstraction of hardware components into logical objects in order to allow a computer system to execute various software modules, for example, multiple operating systems, concurrently and in isolation from other software modules. Virtualization may be achieved by running a software layer, often referred to as a "virtual machine monitor" or "hypervisor," above the hardware and below the virtual machines. A hypervisor may abstract the physical layer and present this abstraction to virtual machines to use, by providing interfaces between the underlying hardware and virtual devices of virtual machines. For example, processor virtualization may be implemented by the hypervisor scheduling time slots on one or more physical processors for a virtual machine, rather than a virtual machine actually having a dedicated physical processor. In another illustrative example, binary translation may be employed for translating instructions to be executed by a virtual machine to the instruction set supported by the host processors. In a yet another illustrative example, application programming interface (API) calls to be executed by a virtual machine may be translated into API calls supported by the host platform. Thus, a virtualized execution environment may be provided for executing software developed for a platform that is different from the native platform of the host computer system.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are systems and methods for providing access to mobile applications by heterogeneous devices.

Some organizations allow their members and/or employees to use personally owned computing devices (such as portable computers, tablets, and/or smartphones) to access the applications and/or data residing on the organization's protected network. This practice is commonly referred to as Bring Your Own Device (BYOD). However, common BYOD solutions may not allow fully-functional access by smartphones to various business applications that were initially designed for devices having larger screens and/or different user interface controls. Furthermore, common BYOD solutions would not allow initiating a session by a smart phone and then seamlessly transitioning to a portable computer (or vice versa), because of the differences in the screen size and/or user interface controls between smart phones and portable computers. Besides, common BYOD solutions may inherently bring increased security risks for the corporate networks hosting the business applications since a personal computing device may be infected by malware which may attempt to perform unauthorized access and copying of data stored on the personal device and/or on the corporate network. Accordingly, some BYOD solutions mitigate the security risks by providing sandbox-like environments which may not always be accessible by smartphones and similar personal devices.

The present disclosure addresses the above-noted and other deficiencies of common implementations by providing a cloud computing environment in which one or more host computer systems execute virtual machines running mobile operating systems (OS), which may be accessed by various computing devices, including desktop or portable computers, tablets, and/or smartphones. The user of a client device may safely access and utilize various data residing on the organization's protected network, since all application data associated with the business applications is stored within the cloud computing environment, while no application data is stored locally on any of the client devices. Furthermore, unauthorized possession of a client device (e.g., due to the device having been lost or stolen) would not result in unauthorized access to the applications and data residing on the organization's protected network, as described in more detail herein below.

The systems and methods described herein may be implemented by hardware (e.g., general purpose and/or specialized processing devices, and/or other devices and associated circuitry), software (e.g., instructions executable by a processing device), or a combination thereof. Various aspects of the above referenced methods and systems are described in details herein below by way of examples, rather than by way of limitation.

Figure 1:
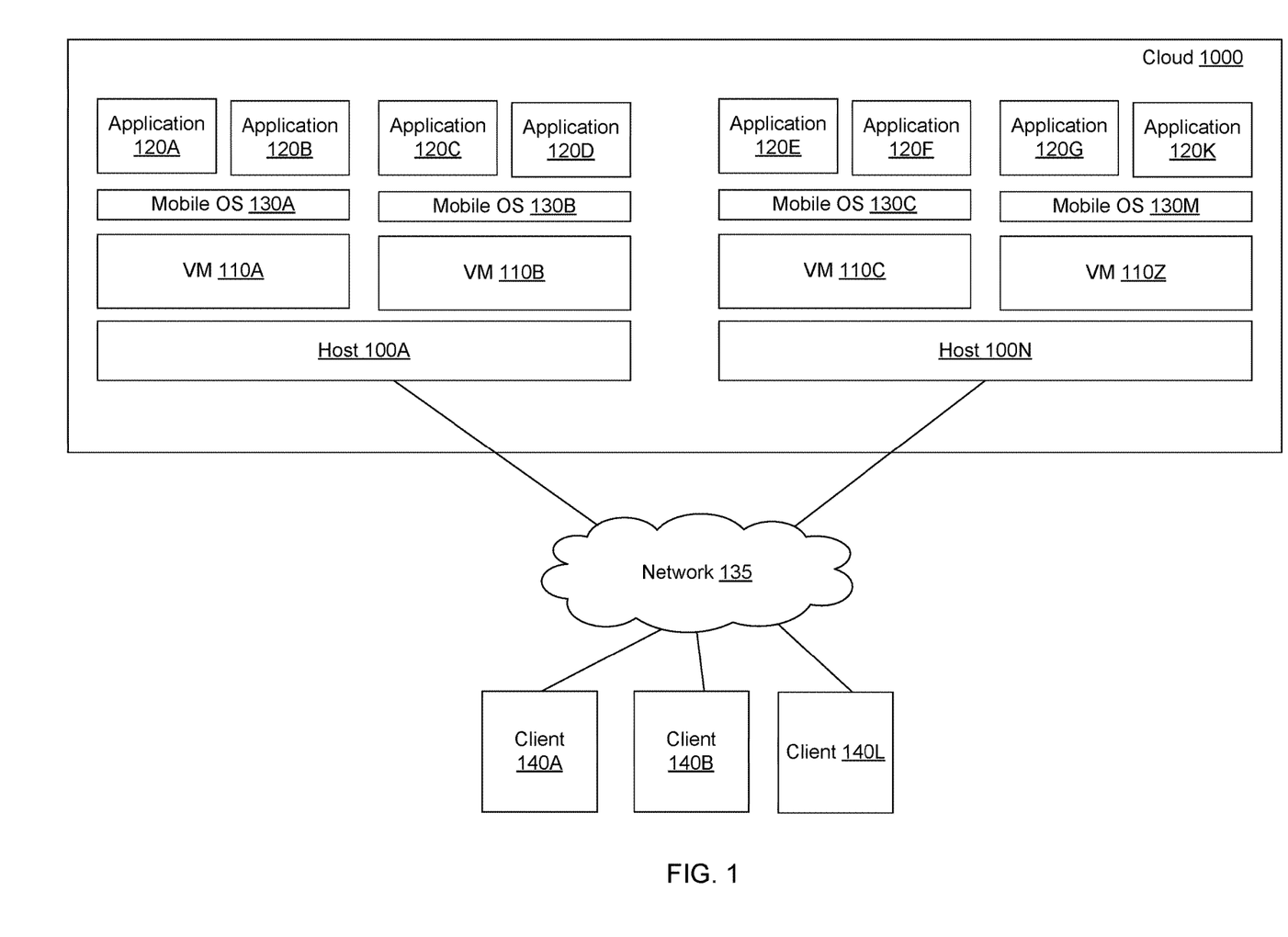
FIG. 1 schematically illustrates a cloud including one or more host computer systems running virtual machines executing mobile applications under the control of respective mobile operating systems, in accordance with one or more aspects of the present disclosure.

FIG. 1 schematically illustrates a cloud 1000 including one or more host computer systems 100A-100N running virtual machines 110A-110Z executing mobile applications 120A-120K under the control of respective mobile operating systems 130A-130M. In various illustrative examples, the cloud 1000 may be provided by a private cloud, public cloud, or a hybrid cloud. Applications 120A-120K may include various mobile applications, including but not limited to Internet browsers, messaging and voice communication applications, banking/insurance client applications, medical record access applications, etc.

Each virtual machine 110 may be accessed, via one or more networks 135, by one or more client devices 140A-140L, which may be represented by desktop or portable computers, tablets, and/or smartphones. Each host computer system 100 may provide a virtualized execution environment for executing software developed for a platform that is different from the native platform of the host computer system, e.g., mobile applications developed for mobile operating systems (such as iOS®, Android®, etc.), as described in more detail herein below with reference to FIG. 4.

A client device 140 attempting to establish a session with a virtual machine 110 may be authenticated by the cloud 1000 using one or more authentication mechanisms, including single-factor password-based authentication or multifactor authentication based on a combination of a user's password, a one-time code, biometric input, etc. The cloud 1000 may include dedicated authentication servers or utilize external authentication servers, such as active directory domain servers residing on a secure network owned by the same entity which owns and/or manages the cloud 1000.

A user may employ two or more client devices to access, simultaneously or sequentially, the same virtual machine. In an illustrative example, a user may utilize a smartphone to launch a word processing application for editing a document and then continue working with the document by connecting to the same virtual machine using a desktop or portable personal computer.

The mobile operating systems 130A-130M managing the applications 120A-120K running on the virtual machines 110A-110Z may be configured in such a way that all application data associated with the applications 120A-120K is stored within the cloud 1000, while no application data is stored locally on any of the client devices 140A-140L. Furthermore, the user of a client device 140 may, by means of virtualized applications 120A-120K, safely access and utilize various data residing on the organization's protected network, since unauthorized possession of a client device (e.g., due to the device having been lost or stolen) would not result in unauthorized access to the application data associated with the applications 120A-120K or to any other data residing on the organization's protected network.

In certain implementations, in order to increase the number of concurrently running virtual machines in the cloud 1000, a virtual machine 110 having no active client connections may be suspended upon expirations of a pre-defined or dynamically configurable period of inactivity (e.g., a period during which there is no client-originated network traffic addressed to the virtual machine). A suspended virtual machine may be periodically resumed in order to allow the running applications to receive incoming messages, notifications, etc. In certain implementations, the cloud service provider may offer various service level agreements (SLAs) with respect to periods of suspension of user's virtual machines, ranging from zero suspension (always running virtual machine) to a specified period of time during which a virtual machine may remain suspended.

In certain implementations, a client device 140 may employ a remote access client application to display one or more windows associated with virtualized applications (i.e., applications running on a virtual machine 110) in a window associated with a remote access session established by the client device 140 with respect to the virtual machine 110. Alternatively, a client device 140 display one or more windows associated with virtualized applications on the client screen which is shared with windows of the local client applications, as if the virtualized applications were a part of the client's local operating system, as schematically illustrated by FIG. 2.

Figure 2:
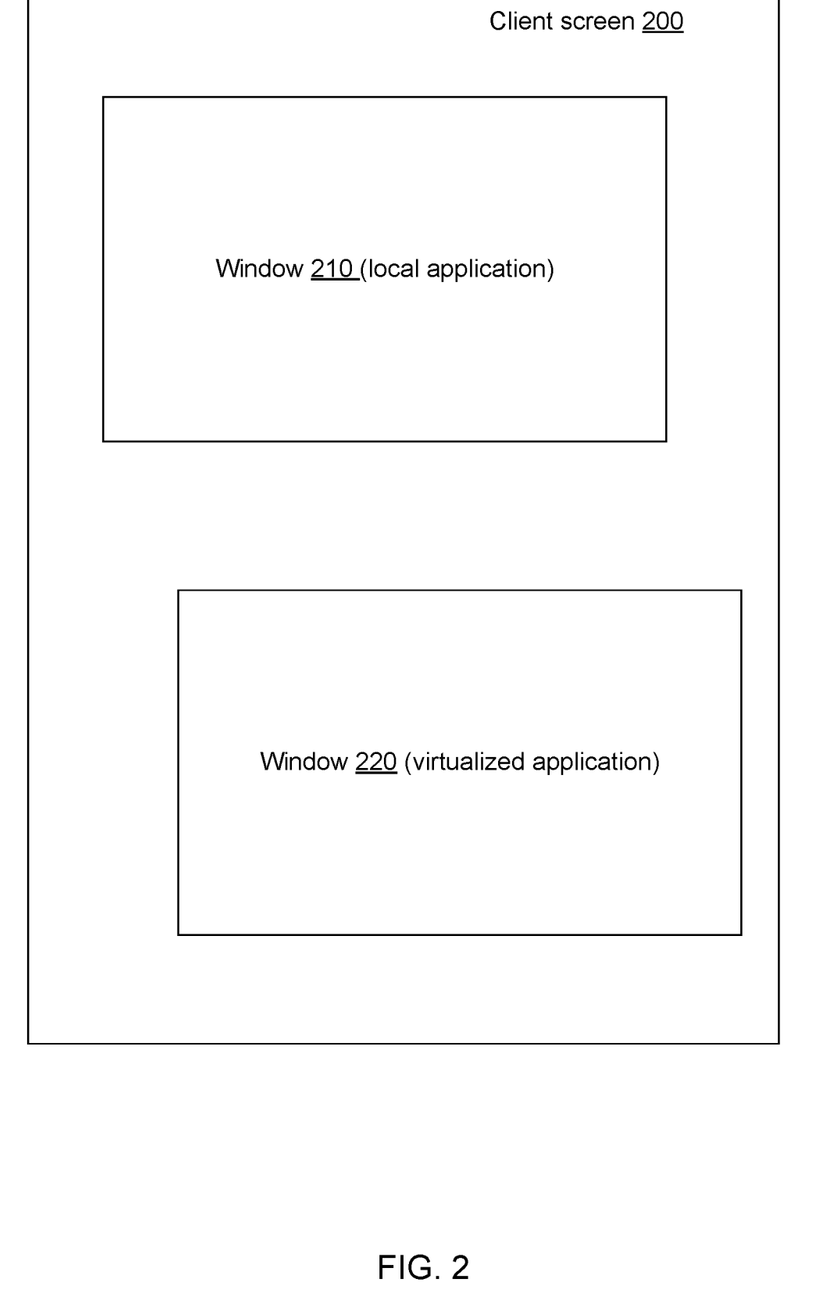
FIG. 2 schematically illustrates rendering virtualized application windows by the client device operating in accordance with one or more aspects of the present disclosure.

FIG. 2 illustrates rendering virtualized application windows by the client device operating in accordance with one or more aspects of the present disclosure. As shown in FIG. 2, a client screen 200 including windows 210 and 220, such that the window 210 is associated with a locally running client application, while the window 220 is associated with a virtualized application being executed by a virtual machine 110 running on a host computer system 100. In order to deliver such functionality, the host computer system 100 may run a host agent employed for intercepting the screen output associated with a specified window of an application running on a virtual machine 110 and forwarding the intercepted screen output to the client 140, which may utilize the received screen output to render the window on the client screen. The client 140 may further intercept the user interface input (e.g., keyboard and mouse input) associated with the specified window and send the intercepted user interface input back to the host agent, which may feed the user interface input to the virtual machine associated with the specified window.

In certain implementations, the client 140 may communicate the client screen settings (e.g., screen size and resolution) to the host agent, which may adjust virtualized application window settings based on the client device screen settings.

Figure 3:
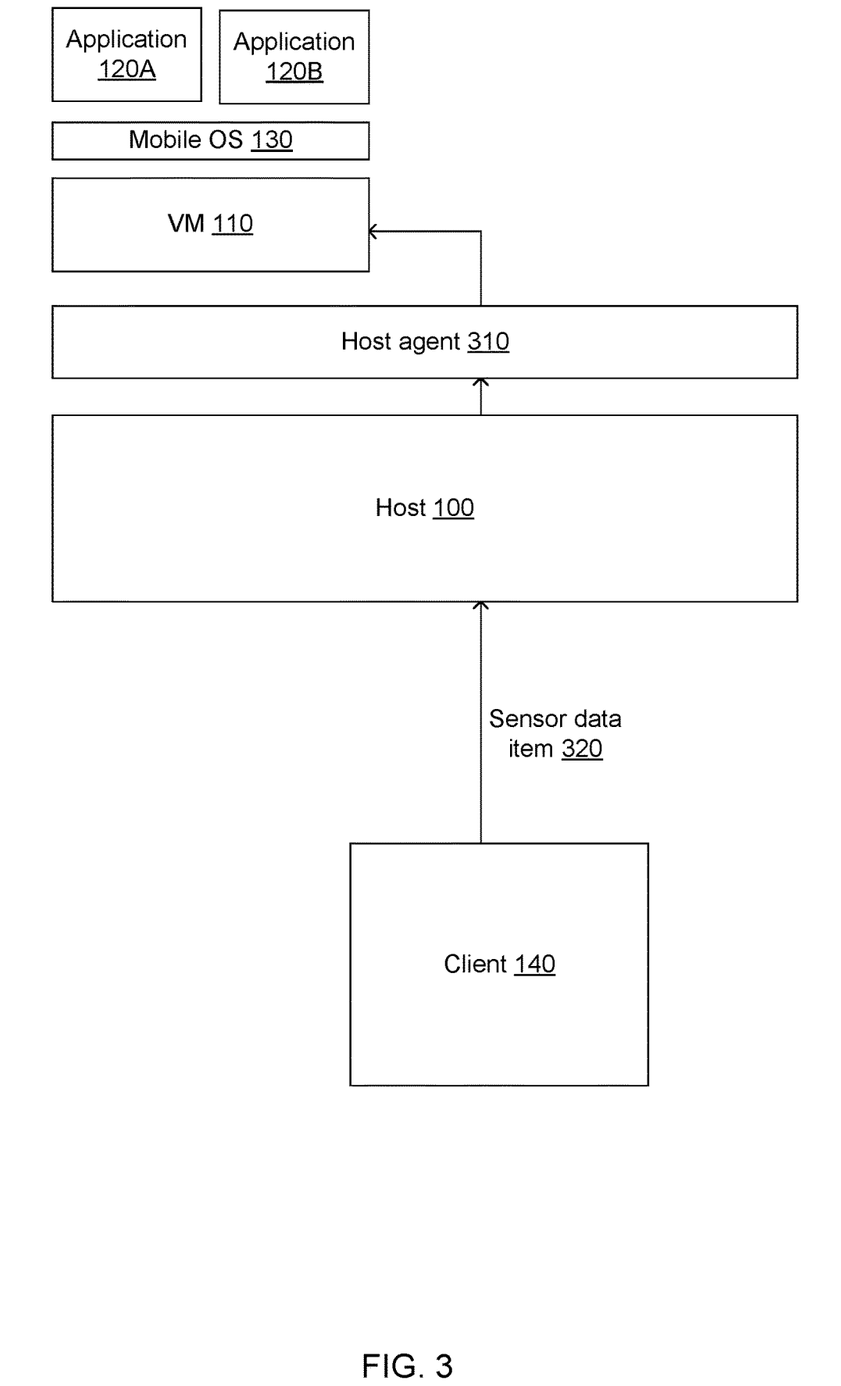
FIG. 3 schematically illustrates forwarding client sensor data to virtualized mobile applications, in accordance with one or more aspects of the present disclosure.

In certain implementations, the virtual machines running mobile operating systems may receive sensor output produced by various sensors of the client mobile devices, including motion sensors (e.g., accelerometers, position sensors (e.g., Global Positioning System (GPS) or Global Navigation Satellite System (GLONASS) sensors), environmental sensors (e.g., illumination sensors or thermometers), medical information sensors, or voltage sensors, as schematically illustrated by FIG. 3.

FIG. 3 schematically illustrates forwarding client sensor data to virtualized mobile applications, in accordance with one or more aspects of the present disclosure. As shown in FIG. 3, the host computer system 100 may run a host agent 310 employed to receive, from the client 140, one or more sensor data items 320 produced by one or more sensors of the client device 140 and to feed the sensor data items 320 to the virtual machine 110.

In an illustrative example, the host agents employed for intercepting the screen output of mobile applications 120 running on a virtual machine 110 and/or for feeding sensor data from client devices to the mobile applications 120 may run within the context of the virtual machine manager. In another illustrative example, the functionality of the host agents may be implemented by a virtualization application running in a non-privileged execution mode in the user space of the host, as described in more detail herein below with reference to FIG. 4. In yet another illustrative example, the functionality of the host agents may be implemented by a daemon process (e.g., a driver) running on the virtual machine.

Figure 4:
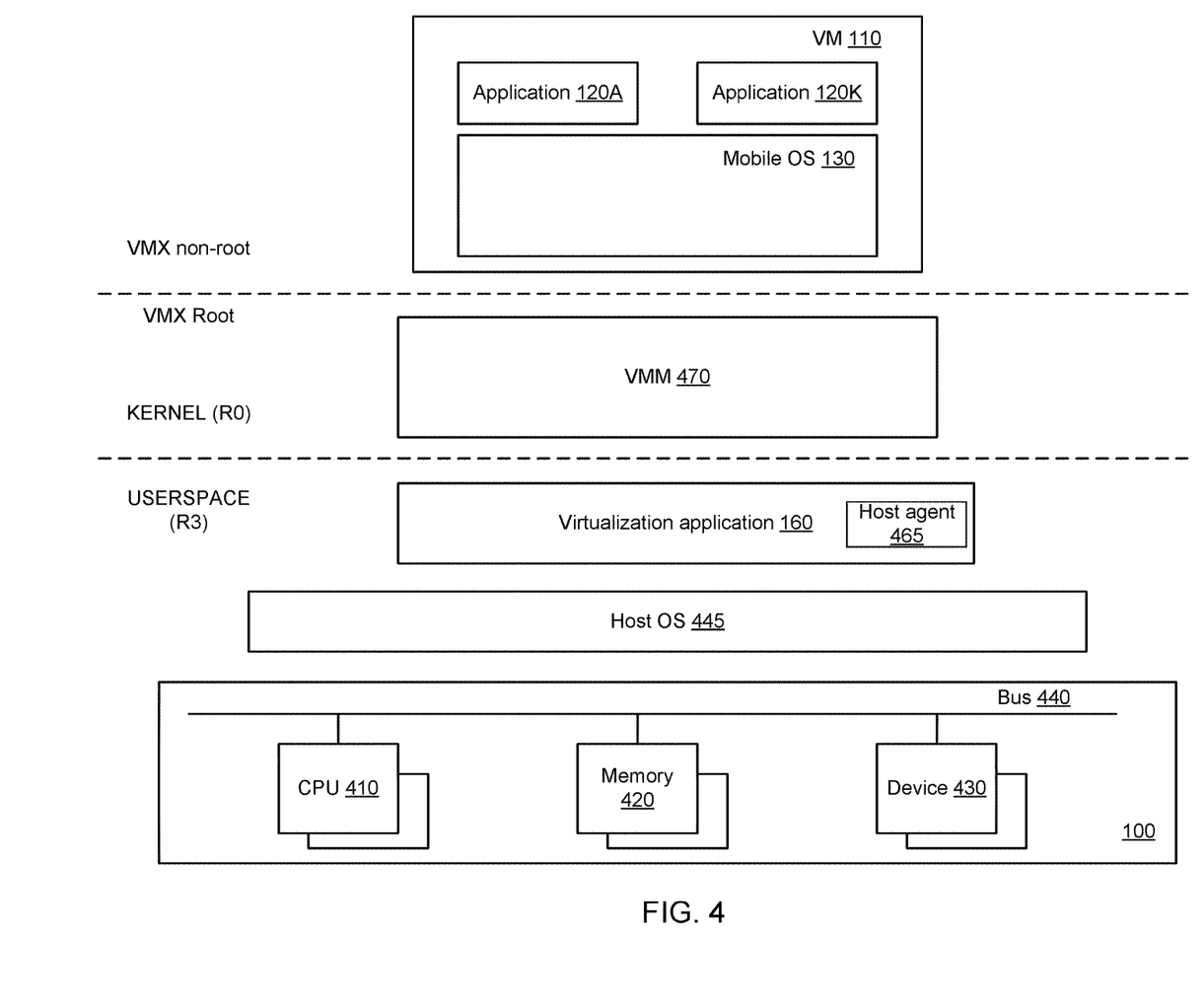
FIG. 4 schematically illustrates an example virtualized execution environment implemented by a host computer system operating in accordance with one or more aspects of the present disclosure.

FIG. 4 schematically illustrates an example virtualized execution environment implemented by a host computer system 100 of the cloud 1000. An example host computer system 100 may include one or more central processing units (CPUs) 410, which may be communicatively coupled to one or more memory devices 420 and one or more peripheral devices 430 via a system bus 440.

"CPU" or "processor" herein refers to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module. A processor may also be referred to as a central processing unit (CPU). "Memory device" herein refers to a volatile or non-volatile memory, such as RAM, ROM, EEPROM, or any other device capable of storing data. Examples of peripheral devices include storage devices (such as flash memory cards, flash memory sticks, compact disks, hard disk drives (HDDs) or solid state drives (SSDs)), input/output (I/O) devices (such as network interface controllers (NICs)) and various other devices.

In certain implementations, the virtual execution environment may be implemented using certain hardware-assisted virtualization features of the processor 410, which may support executing, at an elevated privilege level, a virtual machine monitor (VMM) 470 that manages one or more virtual machines. In various implementations, the VMM 470 may be implemented as a kernel module, a kernel extension, a driver, or a part of the host operating system (OS) 445. The VMM 470 may present a virtual machine 110 with an abstraction of one or more virtual processors, while retaining selective control of processor resources, physical memory, interrupt management, and input/output (I/O). A virtual machine 110 may implement a software environment which may be represented by a stack including a guest operating system represented by a mobile OS 130, under which one or more mobile applications 120A-120K may be running. Each virtual machine 110 may operate independently of other virtual machines and use the VMM-facilitated interface to the processors, memory, storage, graphics, and I/O provided by the host platform 100.

In an illustrative example, a mobile OS 130 may run natively on one or more processors 410 of the host virtual machine 100. In another illustrative example, a mobile OS 130 may be emulated by one or more program modules executed by one or more processors 410 of the host virtual machine 100. In yet another illustrative example, binary translation may be employed for translating instructions to be executed by the virtual machine 100 running a mobile OS 130 to the instruction set supported by the host processors 410.

The host processor 410 may provide hardware-assisted virtualization support by implementing the VMM execution mode (also referred to as VMX root operation in certain processor architectures) and the guest execution mode (also referred to as VMX non-root operation). A transition from the VMM execution mode to the guest execution mode is referred to as a VM entry and may be performed by invoking a special Instruction Set Architecture (ISA)-dependent instruction (e.g., VMLAUNCH/VMRESUME or VMRUN instructions). The reverse transition, i.e., transition from the guest execution mode to the VMM execution mode is referred to as a VM exit and is initiated by the processor in response to detecting one of the triggering events (such as an attempt to execute a certain privileged instruction or to access a certain memory address). Thus, when executed in the guest execution mode, certain instructions and events, instead of their ordinary operation, cause VM exits to the VMM 470. Because these VM exits modify the virtual processor's ordinary behavior, the functionality of software in the guest execution mode is limited by certain preconfigured restrictions for the code being executed. It is this very limitation that allows the VMM 470 to retain the full control of processor resources and prevent the virtual machine 110 from executing an operation that would corrupt the host state. Because the guest execution mode places restrictions even on software running on the virtual processor with the current privilege level (CPL) of zero, the guest software, including mobile OS 130 and mobile applications 120A-120K, may run at the privilege level for which it was originally designed.

In the absence of hardware-assisted virtualization support by the processor 410, binary translation may be implemented for translating instructions to be executed by the virtual machine 110 to the instruction set supported by the processor 410 and/or for shifting the execution privilege levels in the guest execution mode.

In certain implementations, each virtual processor (vCPU) of the virtual machine 110 may be emulated by a dedicated processing thread of the virtualization application 460 running in a non-privileged execution mode in the user space of the host computer system 100. Within such a processing thread, the virtualization application 460 may invoke the functions of the VMM 470 for performing the platform emulation or getting access to the run-time data of the virtual machine(s) 110. Certain instructions executed and/or certain events occurring in the guest execution mode may cause VM exits, which are processed by the VMM 470, which may pass the VM exit reason and other relevant information to the virtualization application 460, which thus exercises control over the execution of the virtual machine 110. Alternatively, virtual processor emulation and/or other functions of the virtualization application 460 may be executed by the VMM 470 in the VMX root execution mode.

In certain implementations, the virtualization application 460 may implement function of the host agent 465 for intercepting the screen output of one or more applications 120 running on a virtual machine 110. In an illustrative example, the host agent 465 may intercept the screen output associated with a specified window of an application 120 running on a virtual machine 110 and may forward the intercepted screen output to a client 140, which may utilize the received screen output to render the window on the client screen. The client 140 may further intercept the user interface input (e.g., keyboard and mouse input) associated with the specified window and send the intercepted user interface input back to the host agent 465, which may feed the user interface input to the virtual machine 110. In certain implementations, the screen output and user interface input may be encoded and transmitted to/from client 140 using a standard application layer protocol, such as Remote Desktop Protocol (RDP) or virtual network computing (VNC) protocol. Alternatively, a proprietary protocol may be utilized for encoding and transmitting the screen output and user interface input.

In certain implementations, the host agent 465 may be further employed to adjust virtualized application window settings based on the client screen settings (e.g., screen size and resolution) received from the client device.

In certain implementations, the host agent 465 may be further employed to receive, from the client 140, one or more sensor data items produced by one or more sensors of the client device 140 and to feed the sensor data items to the virtual machine 110, which may process the sensor data by one or more applications 120A-120K.

Figure 5:
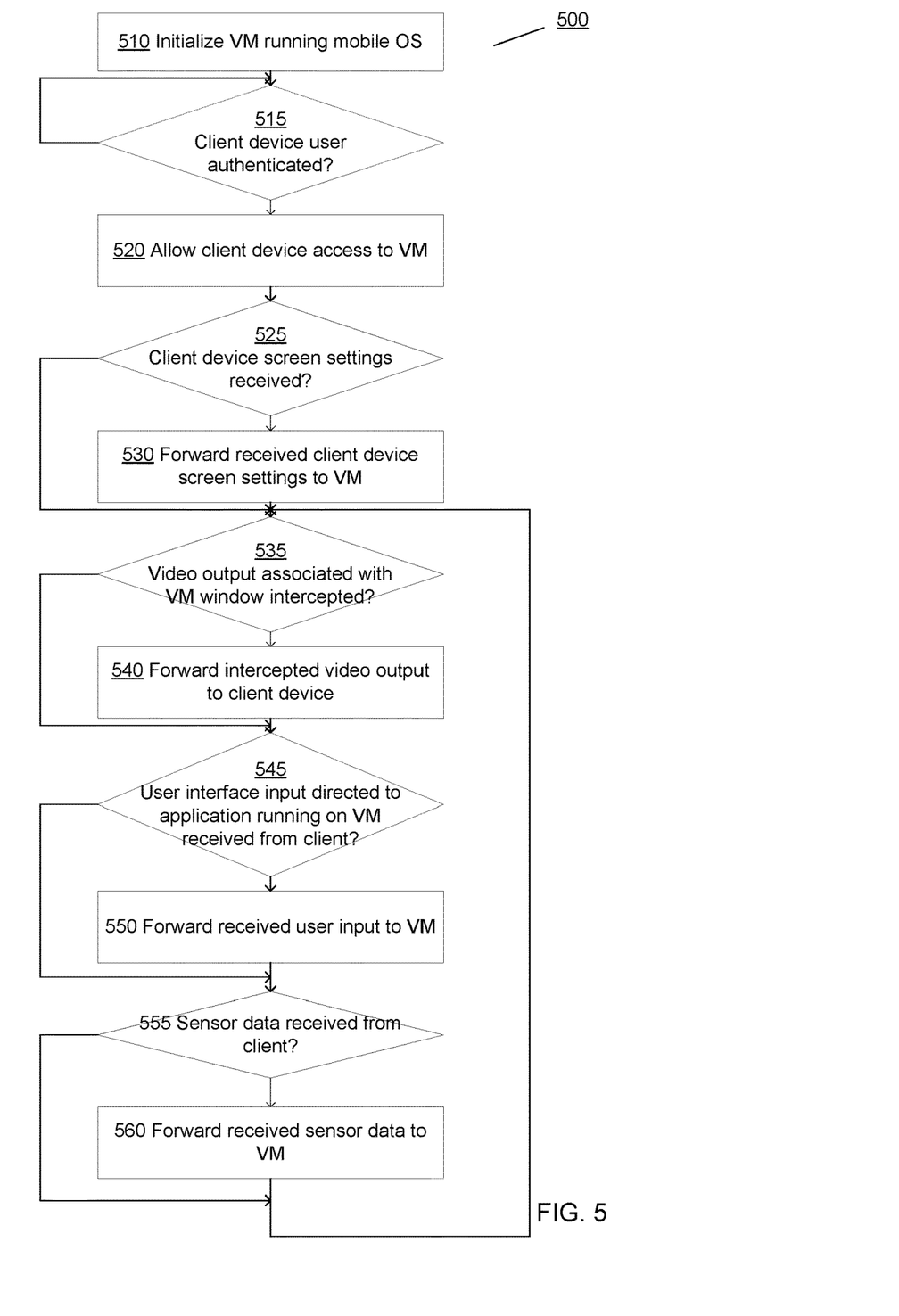
FIG. 5 depicts a flow diagram of an example method of providing access to mobile applications by heterogeneous devices, in accordance with one or more aspects of the present disclosure.

FIG. 5 depicts a flow diagram of one illustrative example of method 500 of providing access to mobile applications by heterogeneous devices, in accordance with one or more aspects of the present disclosure. Method 500 and/or each of its individual functions, routines, subroutines, or operations may be performed by one or more processors of the host computer system (e.g., host computer system 100 of FIG. 1) implementing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other.

At block 510, a host computer system implementing the method may initialize a virtual machine running a mobile operating system (OS). The virtual machine may be managed by a virtual machine manager (VMM) running on the host computer system, as described in more detail herein above.

Responsive to authenticating, at block 515, a user of a client device, the host computer system may, at block 520, allow the client device to access the virtual machine. In various illustrative examples, the client device may be provided by one of: a mobile device, a desktop computer, or a portable personal computer, as described in more detail herein above.

Responsive to receiving from the client device, at block 525, the client device screen settings, a host agent running on the host computer system may, at block 530, forward the received client screen settings to the virtual machine, thus causing the virtual machine to adjust, based on the screen settings, one or more parameters of the window associated with the application running on the virtual machine. The screen settings may include the screen size and/or resolution, as described in more detail herein above.

Responsive to intercepting, at block 535, a video output associated with a window of an application running on the virtual machine, the host agent may, at block 540, forward the intercepted video output to the client device.

Responsive to receiving from the client device, at block 545, a user interface input directed to the application running on the virtual machine, the host agent may, at block 550, forward the received user interface input to the virtual machine.

Responsive to receiving from the client device, at block 555, sensor data produced by one or more sensors of the client device, the host agent may, at block 560, forward the received sensor data to the application running on the virtual machine, and the method may loop back to block 525. In various illustrative examples, the client sensors may include a motion sensor, a position sensor, and/or an environmental sensor, as described in more detail herein above.

Figure 6:
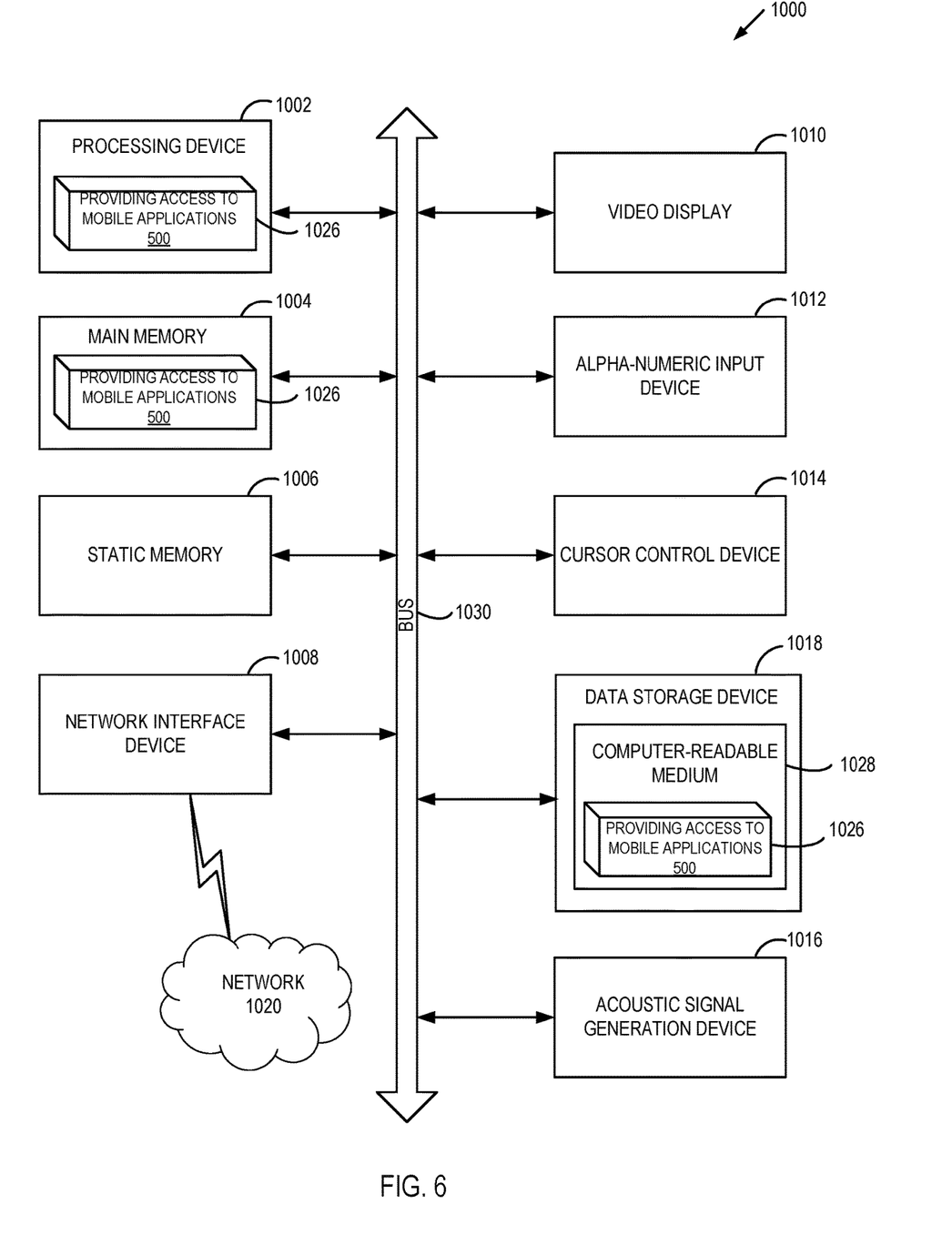
FIG. 6 depicts a block diagram of an example host computer system operating in accordance with one or more aspects of the present disclosure.

FIG. 6 schematically illustrates a component diagram of an example computer system 1000 which may perform any one or more of the methods described herein. In various illustrative examples, computer system 1000 may represent example host computer system 100 of FIG. 1.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute instructions implementing method 500 of providing access to mobile applications by heterogeneous devices.

Example computer system 1000 may further comprise a network interface device 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of method 500 of providing access to mobile applications by heterogeneous devices.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 6 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
   initializing, by a host computer system, a virtual machine utilizing one or more virtual processors to run a mobile operating system (OS), wherein each virtual processor of the virtual machine is emulated by a respective processing thread of a host virtualization application running in a non-privileged execution mode of the host computer system;
   intercepting, by a host agent running on the host computer system, a video output associated with a window of a mobile application running on the virtual machine;
   forwarding the video output to a client device;
   causing the client device to utilize the video output for displaying a client window associated with the mobile application, wherein the client window is displayed on a client screen which is shared with windows of local client applications;
   receiving, from the client device, a user interface input directed to the mobile application; and
   forwarding the user interface input to the virtual machine.

2. The method of claim 1, wherein the client device is provided by one of:
   a mobile device, a desktop computer, or a portable personal computer.

3. The method of claim 1, further comprising:
   forwarding, to the virtual machine, a screen setting of the client device; and
   causing the virtual machine to adjust a parameter of the window based on the screen setting.

4. The method of claim 1, further comprising:
   authenticating a user of the client device.

5. The method of claim 1, further comprising:
   receiving, from the client device, sensor data produced by a sensor associated with the client device;
   forwarding the sensor data to the mobile application.

6. The method of claim 5, wherein the sensor is provided by at least one of: a motion sensor, a position sensor, an environmental sensor, a medical information sensor, or a voltage sensor.

7. The method of claim 1, wherein the host agent is running in a context of a virtual machine monitor (VMM) managing the virtual machine.

8. The method of claim 1, wherein the host agent is running in a non-privileged context of the host computer system.

9. The method of claim 1, further comprising:
   adjusting a parameter of the window based a screen setting of the client device.

10. The method of claim 1, further comprising:
    suspending the virtual machine upon expiration of a specified period of inactivity.

11. A host computer system, comprising:
a memory; and
a processor, coupled to the memory, the processor configured to:
  initialize a virtual machine utilizing one or more virtual processors to run running a mobile operating system (OS), wherein each virtual processor of the virtual machine is emulated by a respective processing thread of a host virtualization application running in a non-privileged execution mode of the host computer system;
  intercept, by a host agent running on the host computer system, a video output associated with a window of a mobile application running on the virtual machine;
  forward the video output to a client device;
  cause the client device to utilize the video output for displaying a client window associated with the mobile application, wherein the client window is displayed on a client screen which is shared with windows of local client applications;
  receive, from the client device, a user interface input directed to the mobile application; and
  forward the user interface input to the virtual machine.

12. The system of claim 11, wherein the processor is further configured to:
  forward, to the virtual machine, a screen setting of the client device; and
  cause the virtual machine to adjust a parameter of the window based on the screen setting.

13. The system of claim 11, wherein the processor is further configured to:
  receive, from the client device, sensor data produced by a sensor associated with the client device;
  forward the sensor data to the mobile application.

14. The system of claim 11, wherein the processor is further configured to:
  adjust a parameter of the window based a screen setting of the client device.

15. The system of claim 11, wherein the processor is further configured to:
  suspend the virtual machine upon expiration of a specified period of inactivity.

16. A non-transitory computer-readable storage medium comprising executable instructions that, when executed by a processor of a host computer system, cause the processor to:
  initialize a virtual machine utilizing one or more virtual processors to run running a mobile operating system (OS), wherein each virtual processor of the virtual machine is emulated by a respective processing thread of a host virtualization application running in a non-privileged execution mode of the host computer system;
  intercept, by a host agent running on the host computer system, a video output associated with a window of a mobile application running on the virtual machine;
  forward the video output to a client device;
  cause the client device to utilize the video output for displaying a client window associated with the mobile application, wherein the client window is displayed on a client screen which is shared with windows of local client applications;
  receive, from the client device, a user interface input directed to the mobile application; and
  forward the user interface input to the virtual machine.

17. The non-transitory computer-readable storage medium of claim 16, further comprising executable instructions causing the processor to:
  forward, to the virtual machine, a screen setting of the client device; and
  cause the virtual machine to adjust a parameter of the window based on the screen setting.

18. The non-transitory computer-readable storage medium of claim 16, further comprising:
  receive, from the client device, sensor data produced by a sensor associated with the client device;
  forward the sensor data to the mobile application.

* * * * *